United States Patent Office 2,952,581
Patented Sept. 13, 1960

2,952,581

DRY MIXTURE

Oscar Lewis Wright, Pittsburgh, Pa., assignor to Pittsburgh Coke & Chemical Company, Pittsburgh, Pa., a corporation of Pennsylvania No Drawing. Filed Oct. 5, 1956, Ser. No. 614,093

16 Claims. (Cl. 167—14)

This invention relates to novel compositions of matter comprising metal carbonates and certain amino carboxylic acids.

It has previously been found that metal salts of certain aminopolycarboxylic acids, such as ethylene-diamine tetraacetic acid, are valuable chemotherapeutic agents for protecting cereal grain plants, e.g., wheat and oats, from rust.

However, the methods of preparing such materials heretofore devised have not been economical.

Furthermore, many of such salts are hygroscopic and, hence, difficulties are encountered when the metal salts of the aminopolycarboxylic acids are packaged and sold as such.

Accordingly, it is an object of the present invention to prepare metal salts of aminocarboxylic acids including ethylenediamine tetraacetic acid, diethylenetriamine pentaacetic acid, N-(β-hydroxyethyl) ethylenediamine triacetic acid, triethylenetetramine hexa-acetic acid, cyanomethyl ethylenediamine triacetic acid, 1,2- cyclohexane diamine N,N,N',N'-tetraacetic acid and nitrilotriacetic acid

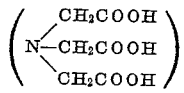

by novel and inexpensive procedures.

Another object is to prepare stable, free flowing compositions which can be packaged and then readily converted into the desired metal salt of the aminopolycarboxylic acid at the place of use.

A further object is to prepare such a composition which will have increased sales attraction due to the nature of the chemical reaction when the mixture is placed in water preparatory to use as a combatant for rust of cereal grains such as wheat and oats.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has been found that these objects can be attained by dry mixing a heavy metal carbonate of the class of cupric basic carbonate, cuprous carbonate, ferrous carbonate, ferric carbonate, cobaltous carbonate, cobaltous basic carbonate, nickelous carbonate, nickelous basic carbonate, chromous carbonate, zinc carbonate, manganous carbonate, cadmium carbonate, mercurous carbonate, mercuric basic carbonate, lead carbonate, and lead basic carbonate with an aminopolycarboxylic acid of the class of ethylenediamine tetraacetic acid, diethylenetriamine pentaacetic acid, triethylenetetramine hexa-acetic acid, N (β-hydroxyethyl) ethylenediamine triacetic acid, cyanomethyl ethylenediamine triacetic acid, 1,2-cyclohexane diamine N,N,N',N'-tetraacetic acid and nitrilotriacetic acid.

The mixtures are made in an equivalence ratio of the metal of the carbonate to the carboxyl groups of the aminopolycarboxylic acid that at least one carboxyl group will be neutralized when the mixture is placed in water. There can be used enough of the metal carbonate so that the metal will neutralize all of the carboxyl groups. The use of excess metal carbonate serves no advantage and is merely wasteful. Preferably, sufficient of the metal carbonate is added to neutralize all of the carboxyl groups of the aminopolycarboxylic acid upon the addition of water.

The dry compositions of the present invention are non-caking, non-corrosive, free flowing, can be readily packaged and are easy to handle. They are readily mixed in the field with water to form the rust treating composition. The person who is to apply the mixture to treat the wheat or oats plants, therefore, need merely add water to the dry mixture (or to add the dry mixture to water) and then spray the plants. The solution of the dry mixture in water is accompanied by an effervescence and in many instances by a deep color change. The effervescence is due to the loss of carbon dioxide with the resulting formation of the metal salt of the aminopolycarboxylic acid. Generally, the mixture and water are combined in proportions to yield 50 to 2000 p.p.m. of metal salt of the aminopolycarboxylic acid in solution.

Several of the metal salts of the aminopolycarboxylic acids are not completely soluble in water. Hence, it has been found advantageous to incorporate an emulsifying agent into the dry composition. The emulsifying agent can be either ionic or nonionic. Generally, the emulsifying agent is employed in a minor amount, e.g., one to 50 parts per 1000 parts of the aminopolycarboxylic acid by weight.

As the emulsifying agents, there can be employed anion active surface active agents, including water dispersible salts of paraffin sulfonic acids, paraffin sulfuric acids, alkyl naphthalene sulfonic acids, alkyl phenol sulfonic acids, alkyl benzene sulfonic acids, alkyl sulfosuccinic acids, mahogany acids, long chain fatty acids, etc. Generally, the sodium salts are employed, but there can also be used potassium, ammonium, triethanolamine and other salts.

Typical examples of anion active agents are sodium dioctylsulfosuccinate (Aerosol OT), sodium dihexylsulfosuccinate (Aerosol MA), Turkey red oil, sodium sulfoethyl phthalate, sodium salt of oleyl-N-methyl taurine (Igepon T), sodium tetradecane sulfonate, sodium diisopropyl napthalene sulfonate (Nekal A), sodium dibutyl naphthalene sulfonate (Nekal BV), sodium decyl benzene sulfonate (Santomerse D), sodium tetradecyl benzene sulfonate, sodium octadecyl benzene sulfonate, sodium phenyl hexane sulfonate, sodium dibutyl naphthalene sulfonate-formaldehyde condensation product, sodium monobutylphenyl phenol sulfonate, sodium lauryl sulfate, sodium cetyl sulfate, sodium stearate, potassium stearate, sodium oleate, sodium salt of cocoanut fatty acids, sodium palmitate, ammonium oleate, triethanol-amine stearate, sodium lignin sulfonate, sodium octadec-9-ene sulfonate, sodium isopropyl butyl naphthalene sulfonate, sodium ethyl cyclohexane-p-sulfonate, sodium butoxy-butyl naphthalene sulfonate, potassium salt of a sulfonated propylene polymer-xylene condensate (Emulphor 51), sodium octyl phenyl butyl sulfonate, sodium tetradecyl phenol sulfonate, sodium monobutyl phenylphenol monosulfonate (Areskap), sodium monobutyl diphenyl disulfonate (Aresket), disodium dibutyl phenylphenol disulfonate (Aresklene), sodium sulfoethyl ester of cocoanut fatty acids, sodium sulfophenyl ester of oleic acid, disodium monocetyl monosulfosuccinate, sodium salt of oleyl-taurine, sodium cetyl sulfate, sodium salt of sulfated oleic acid, sodium oleyl sulfate, sodium octylphenoxy-ethoxyethoxy sulfonate, etc.

As cationic surface active agents, there can be used salts such as cetyl trimethyl ammonium chloride, cetyl trimethyl ammonium bromide, cetyl trimethyl ammonium iodide, cetyl triethyl ammonium chloride (and the corresponding bromide and iodide), cetyl pyridinium bromide, cetyl pyridinium chloride, stearamidomethyl pyridinium chloride, N-oleyl-N',N''-diethyl ethylene diamine acetate (and the corresponding hydrochloride), triethanolamine monooleate (Emulphor FM), diamyl-N-(2-hydroxyethyl) aspartate hydrochloride, oleylamidoethyl diethyl benzyl ammonium chloride, oleyloxyethyl pyridinium chloride, dodecyl dimethyl benzyl ammonium chloride (Triton K–60), etc.

There can also be employed non-ionic surface active agents, e.g., alkylphenol-ethylene oxides, e.g., p-isooctyl phenol-10-ethylene oxide, Triton X–100 (isooctyl phenolpolyethylene oxide condensation product), long chain alcohol-ethylene oxide condensates, e.g., dodecyl alcoholethylene oxide with 4 ethylene oxide groups or the corresponding compound with 16 ethylene ethylene oxide groups, polyglycerol monolaurate, glycol dioleate sorbitan monolaurate, sorbitan monostearate, sorbitan monopalmitate, sorbitan monooleate (Spans), sorbitan laurate, palmitate, stearate or oleate further reacted with ethylene oxide (Tweens), e.g., Tween 20 (polyoxyethylene sorbitan monolaurate), Tween 30 and Tween 80, polyglycol ether alcohols, e.g., Triton NE, compounds of the formula $RO(C_2H_4O)_nR_1$ where R is alkyl, aryl, aralkyl, alkylaryl or an aryl group having at least 10 carbon atoms, $n$ is greater than 2 and $R_1$ is the same as R or hydrogen polyethylene glycols having a molecular weight of 1500, 4000, 6000 or higher (Carbowaxes), fatty acid-ethylene oxide condensates, e.g., Ethofats 3,3–R, 7, 11, 13, 15, 19, 54, 56, 60, 65, S, fatty amine-ethylene oxide condensates, e.g., Ethomeens 8, 10, 12, 14, 16, 18, C, HT, S, T, fatty amide-ethylene oxide condensate, e.g., Ethomids 8, 10, 12, 14, 16, 18, C, HT, S, T and RO, etc. The Ethofats, Ethomeens and Ethomids are described in more detail in Zimmerman and Lavine, "Handbook of Material Trade Names" (1953).

As previous set forth, the metal carbonate and aminopolycarboxylic acid are normally employed in stoichiometric amounts (metal to carboxyl groups).

Unless otherwise stated, all parts and percentages in the specification and claims are by weight.

*Example 1*

7 pounds of basic copper carbonate $$(2CuCO_3 \cdot Cu(OH)_2)$$

and 9 pounds of ethylenediamine tetraacetic acid were ground together to give a light bluish grey, free-flowing powder. This powder did not cake on standing and was non-corrosive. When the dry mixture was mixed with water (1–2 parts by weight to 100 parts by weight of water), the composition effervesced and formed a deep bluish purple homogeneous solution, suitable for spraying.

*Example 2*

8 pounds of basic copper carbonate and 11 pounds of diethylenetriamine pentaacetic acid were ground separately and then intimately mixed together to give a dry powder having properties similar to those of the dry product of Example 1.

*Example 3*

8 pounds of basic copper carbonate and 13 pounds of hydroxyethyl ethylenediamine triacetic acid were ground separately and then intimately mixed together to give a dry product having properties similar to the dry product of Example 1.

*Example 4*

8 parts of ferrous carbonate and 15 parts of diethylenetriamine pentaacetic acid were ground separately to form free-flowing powders. The ground powders were then intimately admixed. The amount of ferrous carbonate was insufficient to furnish enough ferrous iron to neutralize the diethylenetriamine pentaacetic acid. However, ferrous iron oxidizes to the ferric form in air and the proportions used in this example are such as to give a solution of the ferric salt of diethylenetriamine pentaacetic acid with all the carboxyl groups bound to iron when water is added to the powder mixture. The powder was a free-flowing mixture which did not cake on standing and was non-corrosive.

*Example 5*

Example 4 was repeated using, however, 5 parts of ferrous carbonate and instead of the diethylenetriamine pentaacetic acid employing 11 parts of ethylenediamine tetraacetic acid. The results obtained were similar to those in Example 4.

*Example 6*

Example 5 was repeated but the 11 parts of ethylenediamine tetraacetic acid were replaced by 12 parts of hydroxyethyl ethylenediamine triacetic acid.

*Example 7*

71 pounds of dry finely powdered chromous carbonate were mixed with 140 pounds of ethylenediamine tetraacetic acid and one pound of Tide (a commercial alkylaryl sodium sulfonate type of detergent). This mixture, when added to water in an amount of one pound of mixture per 10 gallons of water, effervesced and formed a solution which had some finely divided suspended material therein. The suspended material did not settle. The dry powdered mixture did not cake and was non-corrosive.

*Example 8*

Example 7 was repeated but the Tide was replaced by an equal weight of sodium decyl benzene sulfonate.

*Example 9*

Example 7 was repeated but there were employed to form the dry mixture 7 pounds of the chromous carbonate and in place of the ethylenediamine tetraacetic acid there were employed 15 pounds of diethylenetriamine pentaacetic acid, and the amount of the Tide was reduced to 0.1 pound.

*Example 10*

Example 9 was repeated but in place of the Tide there was employed 0.02 pound of Tween 20 (a polyoxyethylene sorbitan monolaurate).

*Example 11*

5 pounds of dry powdered basic cobaltous carbonate was mixed with 9 pounds of dry powdered hydroxyethylaminoethylamine triacetic acid (hydroxyethylethylenediamine triacetic acid). This dry mixture was a free-flowing powder which upon pouring into 140 gallons of water effervesced and formed a solution suitable for spraying wheat and oats. The dry mixture was non-caking and non-corrosive on standing.

*Example 12*

Example 11 was repeated using 1 pound of the basic cobaltous carbonate and 2 pounds of the hydroxyethylaminoethylamine triacetic acid. The dry mixture was non-caking and non-corrosive.

*Example 13*

Example 11 was repeated using 12 pounds of the basic cobaltous carbonate and replacing the hydroxyethylaminoethylamine triacetic acid by 17 pounds of ethylenediamine tetraacetic acid to obtain a dry non-corrosive and non-caking mixture.

*Example 14*

Example 13 was repeated using 13 pounds of the basic cobaltous carbonate and replacing the ethylenediamine tetraacetic acid by 20 pounds of diethylenetriamine pentaacetic acid to obtain a dry, non-caking and non-corrosive mixture.

I claim:

1. A stable dry mixture of a heavy metal carbonate and an aminopolycarboxylic acid selected from the group consisting of ethylene diamine tetraacetic acid, diethylenetriamine pentaacetic acid, N-(β-hydroxyethyl) ethylenediamine triacetic acid, triethylenetetramine hexaacetic acid, cyanomethyl ethylenediamine triacetic acid, 1,2-cyclohexane diamine N,N,N',N'-tetraacetic acid and nitrilotriacetic acid, said heavy metal carbonate being present in an amount at least sufficient to neutralize one carboxyl group of the amino polycarboxylic acid up to an amount sufficient to neutralize all of the carboxyl groups of the amino polycarboxylic acid.

2. A mixture according to claim 1 wherein the heavy metal carbonate is a copper carbonate.

3. A mixture according to claim 1 wherein the heavy metal carbonate is an iron carbonate.

4. A mixture according to claim 1 wherein the heavy metal carbonate is a chromium carbonate.

5. A mixture according to claim 1 wherein the heavy metal carbonate is a cobaltous carbonate.

6. A mixture according to claim 1 including a surface active agent.

7. A mixture according to claim 1 wherein the heavy metal carbonate is a carbonate of a metal selected from the group consisting of copper, iron, cobalt, nickel, chromium, zinc, cadmium, mercury and lead.

8. A stable dry mixture of a heavy metal carbonate and hydroxyethyl ethylenediamine triacetic acid, said heavy metal carbonate being present in an amount at least sufficient to neutralize one carboxyl group of the hydroxyethyl ethylenediamine triacetic acid up to an amount sufficient to neutralize all of the carboxyl groups of the hydroxyethyl ethylenediamine triacetic acid.

9. A stable dry mixture of a heavy metal carbonate and ethylenediamine tetraacetic acid, said heavy metal carbonate being present in an amount at least sufficient to neutralize one carboxyl group of the ethylenediamine tetraacetic acid up to an amount sufficient to neutralize all of the carboxyl groups of the ethylenediamine tetraacetic acid.

10. A mixture according to claim 9 wherein the heavy metal carbonate is a copper carbonate.

11. A mixture according to claim 10 wherein the copper carbonate is basic cupric carbonate.

12. A mixture according to claim 9 wherein the heavy metal carbonate is an iron carbonate.

13. A stable dry mixture of a heavy metal carbonate and diethylenetriamine pentaacetic acid, said heavy metal carbonate being present in an amount at least sufficient to neutralize one carboxyl group of the diethylenetriamine pentaacetic acid up to an amount sufficient to neutralize all of the carboxyl groups of the diethylenetriamine pentaacetic acid.

14. A mixture according to claim 13 wherein the heavy metal carbonate is copper carbonate.

15. A mixture according to claim 14 wherein the copper carbonate is basic cupric carbonate.

16. A mixture according to claim 13 wherein the heavy metal carbonate is an iron carbonate.

References Cited in the file of this patent
UNITED STATES PATENTS 2,836,537    Skaptason _____ May 27, 1958

OTHER REFERENCES

Bergy: Amer. J. of Pharm., vol. 126, June 1954, pp. 198–216.

Sequestrene, Geigy Ind. Chem. 1953, pp. 1, 18.

Versene Digest, Bersworth Chem. Corp. Tech. Bull. No. 1, 1949, pp. A and 1.

Frear: A Catalogue of Insecticides and Fungicides, Chronica Botanica Co., 1948, vol. 2, pp. 51, 53.

Frear: Chem. of the Pesticides, D. Van Nostrand, 1955, 3rd ed., p. 419.